3,226,905
CELLULAR MATERIAL
George Richardson, Lynn, Mass., Theodore Norton Ferren, Acton, Maine, and Warren Clifton Denley, Saugus, Mass., assignors to General Electric Company, a corporation of New York
Filed Feb. 4, 1963, Ser. No. 255,866
3 Claims. (Cl. 52—666)

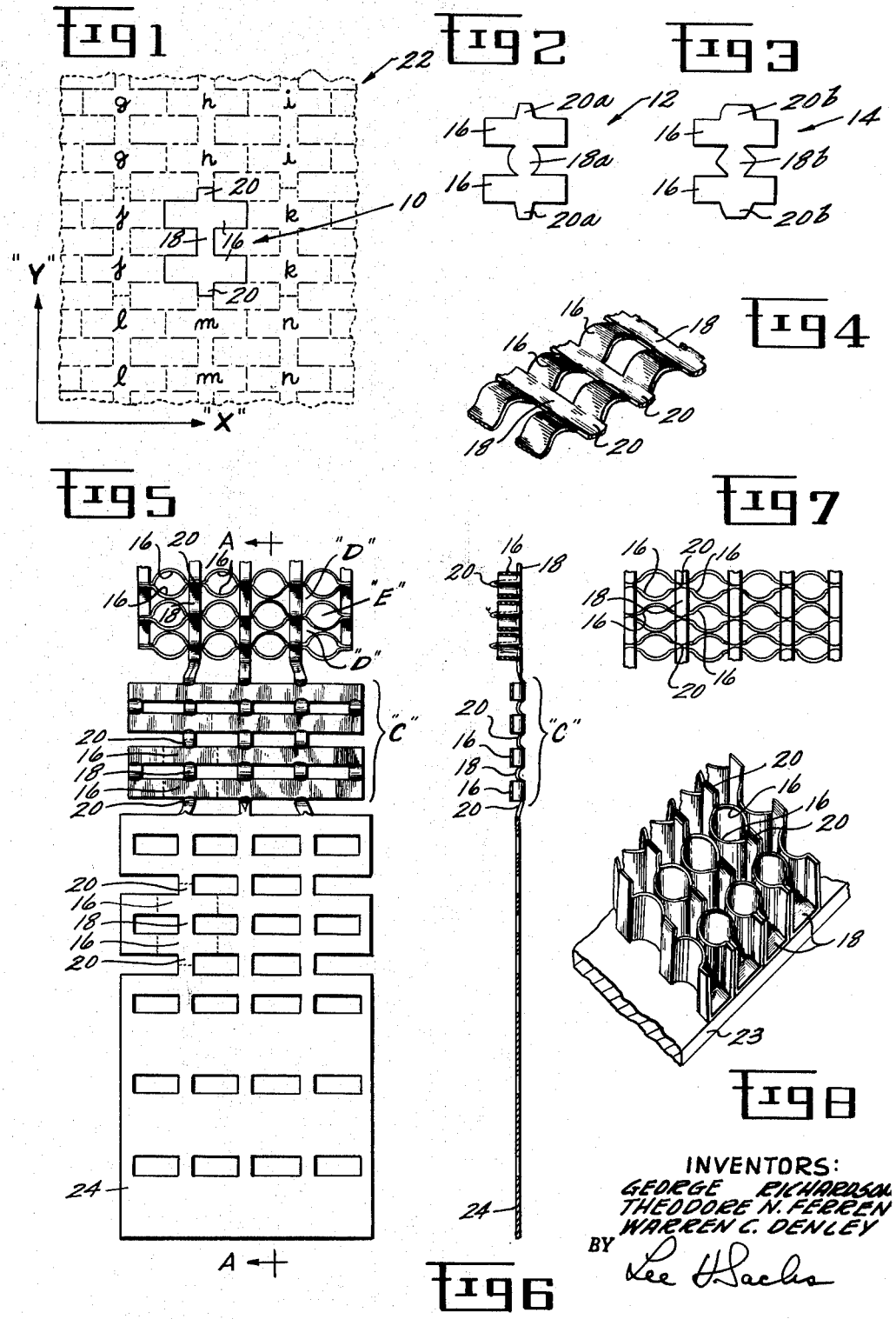

This invention relates to a cellular material, particularly of the honeycomb-type including an integral base and capable of continuous manufacture.

Over the years, the development of the manufacture of honeycomb-type cellular structures has produced a large variety of types of structures and methods of manufacture. These can be seen in the large numbers of available patents and other publications. While most of the known methods and structures involve the joining of separate, independent elements into a honeycomb structure, continuous methods of making such cellular materials have been reported in patents such as U.S. 2,933,122 and U.S. 3,017,971—Christman.

Honeycomb-like cellular materials are characterized by light weight and generally high strength in a direction substantially normal to the openings in the cells. However, in order to use the cellular material as a structural member or as a seal such as in flight propulsion equipment, it is necessary to attach the cellular material to another structural or backing member or to sandwich the cellular material between a plurality of substantially solid structural members. Because prior cellular honeycomb-like materials do not include integral base members, it was necessary to use such attaching methods as pressure welding and brazing in an attempt to achieve substantial attachment of the thin wall structure to a backing member. Brazing is used most frequently. However, brazing methods require additional materials which add to the weight of the structure. Furthermore, the brazing of some honeycomb-type materials for seal purposes to the inside diameters of backing members has resulted in many bonding failures. Because of the different coefficients of expansion, the honeycomb material could not be held in contact with the backing member during brazing.

It is an object of the present invention to provide a cellular material including base members integral with the material to afford ease of attachment such as by spot welding of the cellular material to a backing member.

Another object is to provide a cellular material, with an integral base, in a continuous strip by an improved and relatively inexpensive method of production.

Still another object is to provide a continuous honeycomb-like structure including an integral base, manufactured from a continuous strip of sheet material.

These and other objects and advantages will be more readily recognized from the following detailed description and the drawing in which:

FIGS. 1–3 are fragmentary plan views of cell units which form the basis of the structure of this invention;

FIG. 4 is an isometric fragmentary view of a portion of the structure of the present invention in an intermediate step in its manufacture;

FIG. 5 is a composite plan view of progressive steps in the method of the present invention.

FIG. 6 is a cross-sectional view through A—A of FIG. 5;

FIG. 7 is a fragmentary plan view base side up of the structure of the present invention; and FIG. 8 is an isometric fragmentary view of the structure of the present invention attached to a backing sheet for use together as a sealing member.

Briefly, the cellular structure of the present invention is made up of rows of cells including integral base members alternating with rows of open cells not including base members. The base members connect the lateral walls of those cells which include such base members, and tab means connect the tops of the lateral walls of each of the consecutive rows of cells having base members. The base members and the tab means alternatively interconnect consecutive rows of the cells including base members into a continuous structure. When doing so, the external walls of the cells including base members create or define the peripheral limit of open cells, not including base members.

The method of the present invention in one form comprises perforating a flat sheet material to produce a plurality of interconnected sheet cell units. Each of the sheet cell units comprises first and second cell lateral wall members, a cell base member and first and second tab members. The cell base members extend between the first and second wall members and the first and second tab members extend from the first and second wall members respectively in opposite directions from the base member. The method continues by bending the lateral wall members of each of the plurality of cell units into a wall shape desired for a cell of the cellular material. The lateral wall members formed in this way for each of the cell units are then bent one toward the other along a line from which the base member extends from each wall member to contact aligned outer portions of the lateral wall members while at the same time bending the interconnected tab members of adjacent cell units one toward the other along their lines of connection. Thus a plurality of cells including base members are formed from the plurality of cell units and a plurality of open cells are defined by the lateral walls of adjacent rows of cells including base members.

The cellular structure of the present invention, shown in the isometric view of FIG. 8 attached to a backing member, reduced to its simplest form at the start of its manufacture consists of a sheet cell unit shown in various forms in FIGS. 1–3, as elements 10, 12 and 14. Each sheet cell unit includes a pair of lateral wall members 16, a base member 18, 18a and 18b and a pair of tab means 20, 20a and 20b in FIGS. 1, 2 and 3 respectively. Generally, the shape of lateral wall members 16 is maintained substantially rectangular because the wall members determine the thickness, or depth, of the final cellular material. It is generally desirable to maintain the thickness uniform across the material. However, it is possible without deviating from the scope of this invention to modify the shape of the cell lateral wall members if non-uniformity in thickness of the cellular structure can be tolerated or is desirable. However, the shape of the base member and the tab means can be varied from the rectangular shape 18 in FIG. 1 to the curved shape of 18a in FIG. 2 or the diamond shape of FIG. 3 depending (1) upon the degree to which it is desired to fill the base of the cellular material in the final product and (2) upon the shape in which the lateral wall members of the cell units are bent in specifying the shape of the cells of the cellular material.

Referring to FIG. 1, it is noted that base member 18 extends between lateral wall members 16 and that the tab means 20 extends from the lateral wall members on sides of the wall members opposite from that at which the base means is extended. A plurality of continuous sheet cell units can be formed by perforating a flat sheet of material, a fragment of which is shown generally at 22 in FIG. 1, to produce a plurality of interconnected sheet cell units $g$—$g$, $h$—$h$, $i$—$i$, $j$—$j$, $k$—$k$, $l$—$l$, $m$—$m$ and $n$—$n$, shown in phantom, which generally surround the example sheet cell unit 10 in FIG. 1.

It is noted that sheet cell units $h$—$h$ and $m$—$m$ are aligned with sheet cell unit 10 along the "Y" direction which in this specification for illustration is referred to as the "length" or "column," and sheet cell units j—j and k—k are aligned in the "X" direction which is referred to herein for illustration as the "width" or "row." In the examples of FIGS. 1, 2 and 3, the base members and the tab members extend centrally from the first and second wall members. This symmetrical arrangement has been found to be the best from the standpoint of ease of manufacture and cost of perforating or bending dies because the dies can be used in a repetitious process to perforate or bend a piece of flat sheet material fed continuously beneath them.

Thus the first step in producing the cellular material of the present invention is to perforate or punch from a flat sheet of material a plurality of particularly located openings. The resulting structure forms a plurality of interconnected sheet cell units of the type shown in FIGS. 1–3.

The second step in the manufacturing method is to bend or shape the lateral wall members 16, FIGS. 1–3, to a wall shape desired for a cell of the cellular material. This can be done immediately after perforating or punching flat sheet material by pressing the lateral wall members between two shaped dies. The classical hexagonal shape can be produced in the final product by bending the outer one-third portions of each of the lateral wall members one toward the other to form a channel along the length of the sheet material with the base member and tab means lying along the bottom of the channel. It has been found, however, that a preferred method of bending the lateral wall members is by corrugating the perforated sheets so that the corrugation furrows and ridges extend along the length of the sheet with the bottom of the furrow lying along the line of the base member and tab means. A portion of sheet material 22 of FIG. 1, after such corrugation is shown in FIG. 4. The perforated and corrugated flat sheet material of FIG. 4, when viewed in cross-section in the "X" direction would have the appearance of a sine wave with the points of inflection of the furrows and ridges alternating substantially along the juncture between the lateral wall members of adjacent cell units, such as cell units j—j, 10 and k—k respectively, and along the co-linear base and tab members 18 and 20 of FIG. 1. Cell units formed by corrugating the sheet material after perforating and prior to further forming will ultimately result in a cell structure shown in FIGS. 7 and 8 wherein the characteristic sharp hexagonal honeycomb shape is replaced by a curved shape.

After the lateral wall members of each of the plurality of cell units have been bent in the desired shape, the lateral wall members of each cell unit are bent one toward the other along the line from which base member 18 extends from each of the wall members until the aligned outer portion of the lateral wall members of aligned cell units contact one another. For example, in FIG. 1, the cell lateral wall member 16 nearer to cell unit h—h is bent upward from the plane of the drawing along a line from which base member 18 extends from that cell lateral wall member while at the same time the cell lateral wall member 16 nearer to cell unit m—m is bent up from the plane of the drawing, and thus toward the other lateral wall member of cell unit 10, along a line from which base member 18 extends from that cell lateral wall member. At the same time, during manufacture of a continuous structure, the adjacent cell units j—j and k—k along with the associated tab means of cell units g—g, h—h, i—i, l—l, m—m and n—n, etc., will be similarly bent. The cell lateral wall members 16 are thus bent one toward the other until the line of juncture between the lateral wall members of cell units 10 and j—j, and the juncture between the lateral wall members of cell units k—k and 10 are in contact. At the same time the interconnected tab members of adjacent cell units aligned along the length of the sheet material are bent one toward the other along their lines of connection. In this way the completed cellular structure shown in FIGS. 7 and 8 and at the top of FIGS. 5 and 6 are formed.

When working with sheet metal which has a tendency to spring back slightly from bending operations, it might be necessary, additionally, to pinch together the bent tab members 20 in order to maintain the lateral walls of adjacent rows of cells in substantial contact or close proximity. In this way two types of cells are formed in alternating rows in the structure of the present invention. These two types of cells are indicated in FIGS. 5 and 7 as "D" and "E." The "D" type cell includes a base member 18 whereas the "E" type cell does not include a base member. The "E" type cell is referred to herein as an "open cell." The final structure, made from a continuous sheet which has been punched and bent, is held into a continuous interconnecting structure alternatively by the base members 18 and the tab means 20. The lateral walls of consecutive rows of "D" type cells, when contacting one another, create the type "E" or open cells.

As shown in FIGS. 6 and 8, tab means 20 can extend above the lateral wall of the structure. This provides in the structure of the present invention the spring-like ability to expand with an expanding backup member such as 23 in FIG. 8 to which the base members of the cellular structure can be welded. In this way a rubbing type seal used extensively in gas turbine engines, can be made.

FIGS. 5 and 6 are composite views of one method of manufacturing the cellular material of the present invention described above. Starting at the bottom of FIG. 5, a plurality of substantially rectangular openings are perforated in sheet metal 24 to produce the sheet cell units shown in phantom in FIG. 5 and bearing like numbers to those cell units discussed before. That portion of FIG. 5 bracketed and identified as "C" represents the appearance of the cell units and sheet metal structure after corrugation as described above. In forming the type of corrugations shown in FIGS. 5 and 6 at "C," a curvature was provided to base members 18 and tab means 20 as shown particularly in FIG. 6. This was done principally to provide a first bend to tab means 20 which subsequently is further pinched as shown at the top of FIG. 6. However, in finally producing the completed structure shown at the top of FIG. 6, the dies employed in this example flatten or remove the curvature in base members 18 so that they may be more easily joined such as by brazing or welding to a back up member 23 in FIG. 8. The top of FIGS. 5 and 6 show the completed structure. FIG. 5 is a plan view from the top with the tabs side up and the bases farthest from the viewer. FIG. 7 is a plan view of the finished structure with the base side up and the tabs farthest from the viewer.

Although the structure and method of manufacture of the present invention has been described in connection with specific embodiments, it will be recognized by those skilled in the art the variations and modifications, such as the shapes of the various elements, without deviating from the basic invention of a cellular honeycomb-type structure including an integral base economically and continuously manufactured from sheet material.

What is claimed is:

1. A cellular structure comprising:

alternating rows of cells including base members and rows of open cells, the row disposed transversely with respect to the length of the structure in a honeycomb-like system, the base members connecting lateral walls of the cells including base members;

tab means connecting the tops of the lateral walls of consecutive rows of cells including base members;

the base members and tab means alternatively interconnecting consecutive rows of cells including base members into a continuous structure, the external walls of the cells including base members defining the peripheral limits of the open cells.

2. A cellular structure formed from a continuous sheet material comprising:

alternating rows of cells including base members and rows of open cells, the rows disposed transversely with respect to the length of the structure in a honeycomb-like system, the base members being in substantial alignment along the length of the structure and connecting lateral walls of the cells including base members;

tab means extending from the lateral walls of the structure on the side opposite the base members and connecting the tops of the lateral walls of consecutive rows of cells including base members in substantial alignment with the base members, the base members and tab means alternatively intering consecutive rows of cells including base members into a continuous structure, the external walls of the cells including base members defining the peripheral limits of the open cells.

3. A cellular metallic structure formed from a continuous sheet metal strip comprising:

alternating rows of cells including substantially rectangular base members and rows of open cells, the rows disposed transversely with respect to the length of the structure in a honeycomb-like system, the base members being in substantial alignment along the length of the structure and connecting lateral walls of the cells including base members;

tab means extending above the lateral walls of the structure on the side opposite the base members and connecting the tops of the lateral walls of consecutive rows of cells including base members in substantial alignment with the base members, the base members and tab means alternatively interconnecting consecutive rows of cells including base members into a continuous structure, the external walls of the cells including base members defining the peripheral limits of the open cells.

References Cited by the Examiner

UNITED STATES PATENTS

| | | | |
|---|---|---|---|
| 748,669 | 1/1904 | Valentine | 52—180 |
| 1,176,484 | 3/1916 | Otis | 189—83 |
| 3,009,241 | 11/1961 | Giovannucci | 29—455 |
| 3,123,907 | 3/1964 | Thomas | 29—455 |

RICHARD W. COOKE, JR., *Primary Examiner.*

JACOB L. NACKENOFF, FRANK L. ABBOTT,
*Examiners.*